(No Model.)
J. A. KENDALL.
STEAM COOKER.
No. 515,880.          Patented Mar. 6, 1894.
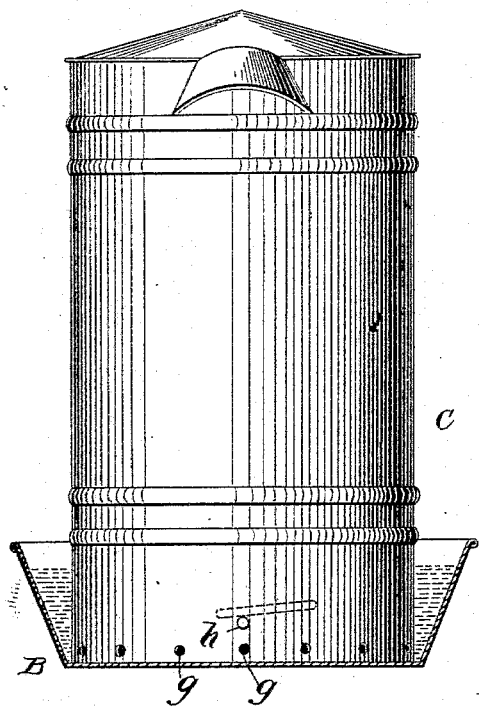
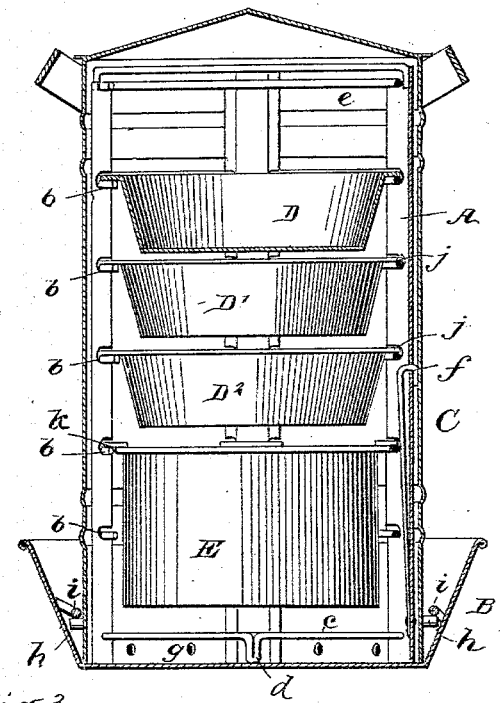
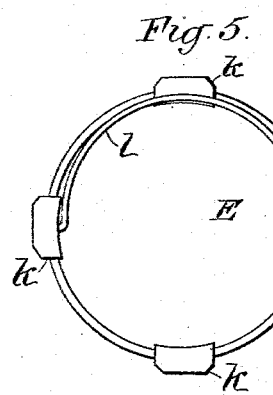
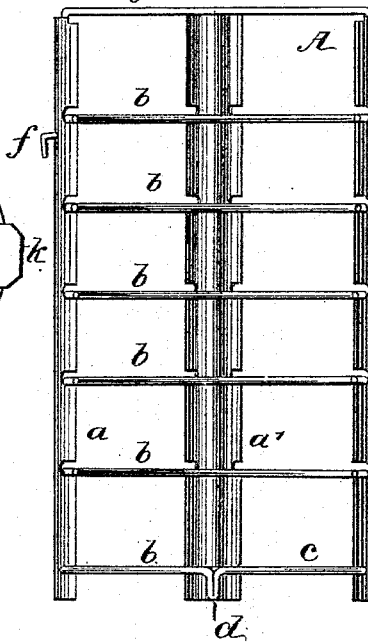
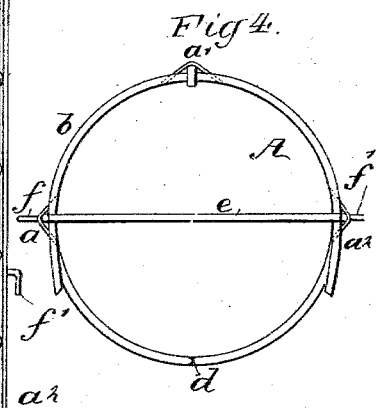
WITNESSES:
Paul Jolot
C. Sedgwick
INVENTOR
J. A. Kendall
BY
Munn & Co
ATTORNEYS.

UNITED STATES PATENT OFFICE.

JOHN A. KENDALL, OF MAYSVILLE, MISSOURI.

STEAM-COOKER.

SPECIFICATION forming part of Letters Patent No. 515,880, dated March 6, 1894.

Application filed May 10, 1893. Serial No. 473,726. (No model.)

*To all whom it may concern:*

Be it known that I, JOHN A. KENDALL, of Maysville, in the county of De Kalb and State of Missouri, have invented a new and Improved Steam-Cooker, of which the following is a specification, reference being had to the accompanying drawings, forming a part thereof, in which—

Figure 1 is a side elevation, partly in section, of my improved steam cooker. Fig. 2 is a vertical transverse section. Fig. 3 is a side elevation of the vessel support. Fig. 4 is a plan view of the same; and Fig. 5 is a plan view of one of the larger vessels used in the cooker.

Similar letters of reference indicate corresponding parts in all the views.

The object of my invention is to provide a steam cooker capable of holding several vessels of different sizes, the vessels being held in such a way that they may be readily inserted or removed, the said cooker being constructed to cook the articles of food contained by it by steam under pressure.

My invention consists in a pan for holding the water, a frame for supporting vessels for containing the food, a cover for inclosing the frame and the vessels, the said cover being arranged to dip into the water in the pan, and a supporting device for holding the cover at different heights, all as will be hereinafter more fully described.

The frame A, which holds the several vessels in which the food to be cooked is contained, consists of three uprights $a, a', a^2$, which are connected by curved wires $b$, the said wires forming a little more than a half circle, the uprights $a, a^2$ being arranged at diametrically opposite points, while the upright $a'$ is arranged at an angle of ninety degrees from the uprights $a$ and $a^2$. The uprights, which are made of sheet metal, are angled to give them strength and are notched to receive the curved wires $b$, and also to afford space for the rims of the pans or other vessels to be inserted in the frame. The lower ends of the uprights are connected by a circular wire $c$, which is provided with a loop $d$, which answers the purpose of a leg which is located about ninety degrees from the uprights $a, a^2$, and the upper ends of the diametrically opposite uprights $a$ and $a^2$, are connected by a wire $e$.

In the uprights $a, a^2$, are secured umbrella catch springs $f, f'$, at different heights, the free ends of the springs projecting through apertures in said uprights.

The frame A, constructed in the manner described, rests in the pan B, and the cylindrical cover C fits over the frame and enters into the water contained by the pan B. The cover C is closed steam tight at the top and is provided with a row of perforations $g$, at the bottom, for the escape of steam. The cover C is also provided at diametrically opposite points with studs $h$, projecting radially from the sides, and in the pan B are secured oblique wires $i$, which together with the studs $h$, form a fastening for the cover.

The pans D, D', D², which are designed to contain the food to be cooked, are of the usual form, having projecting flanges or rims $j$, which rest upon the curved wires $b$.

The pail E, which fits into the frame A, is provided with ears $k$, which rest upon one of the wires $b$, the said pail being provided with a bail $l$ for convenience in handling.

When it is desired to examine the contents of the cooker, the cover C may be raised up to different heights and allowed to rest on one or the other of the catches $f, f'$. When the cover is down and closed by the fasteners, the steam is confined in the cooker and reaches a pressure equal to the column of water contained by the pan B. As a consequence, the cooking temperature is a little higher than that of boiling water.

Having thus described my invention, I claim as new and desire to secure by Letters Patent—

1. In a steam cooker, a vessel support comprising uprights connected together by wires, the lower one of which is provided with a leg, substantially as described.

2. In a steam cooker, the combination of the notched uprights $a, a', a^2$, the curved wires $b$ secured to the uprights, and cooking vessels provided with projecting edges adapted to rest on the curved wires, substantially as specified.

3. In a steam cooker, a vessel supporting frame provided with spring catches adapted to support a cover placed over the frame, substantially as described.

4. In a steam cooker, the combination with a cover, of a vessel supporting frame provided on its inner face with spring catches projecting through apertures in the frame, substantially as described.

5. A steam cooker, comprising a pan for containing water, a vessel supporting frame resting in the pan, a cover having perforations in its lower end and resting in the pan, and means for securing the cover or cap in the pan and for holding it at different heights, substantially as described.

6. A steam cooker, comprising a pan for containing water, a frame resting in the pan and provided with spring catches, vessels supported in the said frame, and a cover fitting over the frame and resting in the pan, and means for locking the cover or cap to the pan, substantially as described.

JOHN A. KENDALL.

Witnesses:
SAM DE VILLE,
A. B. CHRISMAN.